(12) United States Patent
Bellet et al.

(10) Patent No.: US 10,033,127 B2
(45) Date of Patent: Jul. 24, 2018

(54) ELECTRICAL CONNECTION DEVICE FOR A COMPRESSOR AND COMPRESSOR COMPRISING SUCH AN ELECTRICAL CONNECTION DEVICE

(71) Applicant: Valeo Japan Co., Ltd., Saitama (JP)

(72) Inventors: Augustin Bellet, La Chapelle D'Aunainville (FR); Xin Xu, Hubei (CN)

(73) Assignee: Valeo Japan Co., Ltd., Saitama (JP)

( * ) Notice: Subject to any disclaimer, the term of this patent is extended or adjusted under 35 U.S.C. 154(b) by 277 days.

(21) Appl. No.: 14/897,841

(22) PCT Filed: Jun. 13, 2014

(86) PCT No.: PCT/IB2014/062189
§ 371 (c)(1),
(2) Date: Dec. 11, 2015

(87) PCT Pub. No.: WO2014/199343
PCT Pub. Date: Dec. 18, 2014

(65) Prior Publication Data
US 2016/0172777 A1    Jun. 16, 2016

(30) Foreign Application Priority Data
Jun. 14, 2013    (FR) ..................... 13 55605

(51) Int. Cl.
*H02K 11/00* (2016.01)
*H01R 13/405* (2006.01)
(Continued)

(52) U.S. Cl.
CPC ......... *H01R 13/405* (2013.01); *H01R 13/424* (2013.01); *H01R 13/5213* (2013.01);
(Continued)

(58) Field of Classification Search
CPC ....... H02K 5/225; H02K 11/23; H01R 13/405
(Continued)

(56) References Cited

U.S. PATENT DOCUMENTS

| 6,664,678 B2 * | 12/2003 | Shimizu | H01R 13/405 310/71 |
| 6,910,904 B2 * | 6/2005 | Herrick | F04B 39/121 439/271 |

(Continued)

FOREIGN PATENT DOCUMENTS

WO    2013/000528 A1    1/2013

OTHER PUBLICATIONS

International Search Report issued in corresponding application No. PCT/IB2014/062189 dated Sep. 15, 2014 (4 pages).

*Primary Examiner* — Hanh Nguyen
(74) *Attorney, Agent, or Firm* — Osha Liang LLP

(57) ABSTRACT

The invention concerns an electrical connection device (5) for a compressor, the electrical connection device (5) comprising a connection block (7) for connection to an electric motor (2) of the compressor, a plurality of removable electrical connection elements (72) fitted in a triangle in said connection block (7) to engage with a connection terminal (6) of a control device (1) of said electric motor (2) and at least one electrically insulating element (8) removably mounted on the connection block (7) in such a way as to insulate the electrical connection elements (72) from a wall separating the control device (1) from the electric motor (2), said electrically insulating element (8) being configured to provide a stop for said electrical connection elements (72) when said connection block (7) is inserted into said electrically insulating element (8). The invention also concerns a compressor comprising such an electrical connection device (5).

15 Claims, 4 Drawing Sheets

Figure 1:
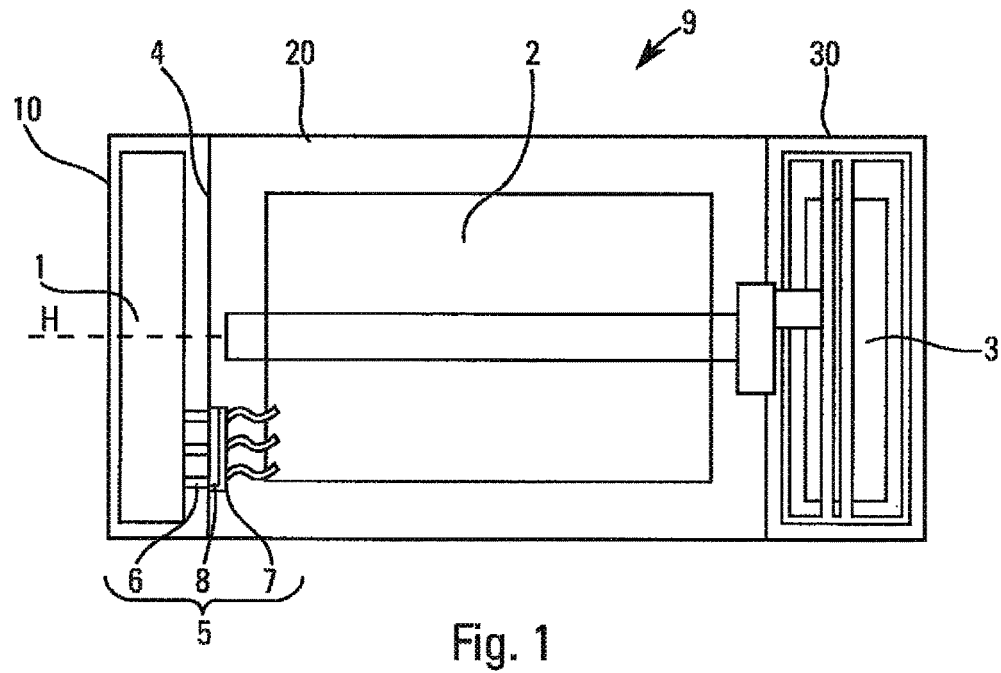

(51) Int. Cl.
*H01R 13/424* (2006.01)
*H01R 13/52* (2006.01)
*H01R 13/53* (2006.01)
*H02K 11/33* (2016.01)
*H02K 5/22* (2006.01)
*H01R 13/514* (2006.01)

(52) U.S. Cl.
CPC ............ *H01R 13/53* (2013.01); *H02K 5/225* (2013.01); *H02K 11/33* (2016.01); *H01R 13/514* (2013.01); *H01R 2201/26* (2013.01)

(58) Field of Classification Search
USPC ...................................... 310/88, 71; 439/685
See application file for complete search history.

(56) References Cited

U.S. PATENT DOCUMENTS

| | | |
|---|---|---|
| 7,632,148 B1 | 12/2009 | Kawamura et al. |
| 2002/0049004 A1 | 4/2002 | Davis et al. |
| 2009/0047842 A1* | 2/2009 | Li .......................... H01R 4/185 439/685 |

* cited by examiner

ELECTRICAL CONNECTION DEVICE FOR A COMPRESSOR AND COMPRESSOR COMPRISING SUCH AN ELECTRICAL CONNECTION DEVICE

The invention relates to an electrical connection device for a compressor and to a compressor comprising such an electrical connection device. It will find applications particularly in the sector of compressors for refrigerant circuits with which motor vehicles are equipped.

In such circuits, the refrigerant is circulated through an airconditioning circuit using a compressor. Conventionally, this compressor is of a mechanical type and its rotation is driven by a pulley connected to the internal combustion engine of the vehicle by a belt.

The number of hybrid vehicles, which means to say vehicles with an internal combustion engine coupled to an electric motor, or all-electric vehicles, which means to say vehicles propelled exclusively by an electrical machine, is constantly increasing as the fossil fuels which power combustion engined vehicles become increasingly scarce.

The mechanical energy usually supplied by the internal combustion engine is therefore less available or completely unavailable in the case of all-electric vehicles. Moreover, for reasons of overall efficiency, the preferred solution for driving a compressor in a hybrid or electric vehicle is to power an electric motor that drives the compressor, rather than using a belt drive of the electric machine.

However, one particular model of vehicle may be sold as a version fitted with an internal combustion engine and a mechanical compressor but also as a version equipped with a propulsion motor of electrical type requiring the use of an electric compressor.

These two types of compressor are based on different technologies which require the use of different lubricants. Specifically, the presence of high electrical potentials in an electric compressor dictates the use of a dielectric lubricant which has electrical insulation properties superior to those of a conventional lubricant used in a mechanical compressor.

Aside from the fact that the cost of a dielectric lubricant is higher than that of a conventional lubricant used in a mechanical compressor, such a situation means that the motor vehicle manufacturer has to perform stock control on two types of lubricant on the vehicle production line. This stock control of two lubricants is particularly onerous and increases the risk of error on the production line.

In order to alleviate this disadvantage and allow just one and the same lubricant to be used, the patentee has already developed an electrical connection device for a compressor that comprises a housing in which the electrical connection elements, placed in a triangle for space minimization reasons, are held in position. Such a device also comprises a cover to close the housing intended to reduce the risk of electric arcing. Openings are made in the housing to allow the electrical connection elements to be mounted and/or removed. However, the positioning of the electrical connection elements in the device leaves room for improvement.

The invention thus proposes an electrical connection device for a compressor, the electrical connection device comprising a connection block for connection to an electric motor of the compressor, a plurality of removable electrical connection elements, fitted in a triangle into said connection block to collaborate with a connection terminal of a control device for controlling said electric motor and at least one electrically insulating element mounted removably on the connection block so as to insulate the electrical connection elements from a wall separating the control device from the electric motor, said electrically insulating element being configured to provide an end stop for said electrical connection elements as said connection block is inserted into said electrically insulating element.

Thus, by virtue of the invention, use is made of the electrically insulating element while the connection block is being mounted in the electrically insulating element in order to position the electrical connection elements by abutment. This then limits the risks of the electrical connection elements being incorrectly positioned in the block and therefore the risk of defective electrical connections. It may also be noted that planning to perform this function of positioning the electrical connection elements using the electrically insulating element makes it possible to have a connection block of simple structure, thereby promoting fluid tightness.

The electrically insulating element also forms an insulating cap and makes it possible to increase the distance between the wall, which is at ground potential, and the electrical elements of the connection block which are at a high electric potential. Thus, even if the wall of the motor compartment is covered with lubricant, the risk of an electric arc forming between the wall and an electrical element is low given that the electrically insulating element compensates for any deficiency in electrical insulation of the lubricant.

According to one aspect of the invention, said connection block is configured to allow said electrical connection elements to be introduced into said connection block in a direction referred to as the direction of mounting. Said end stop ensures that the electrical connection elements are held in position in an opposite direction to said direction of mounting.

According to one embodiment of the invention, the electrical connection elements are capable of translational movement in the connection block when said electrically insulating element is not present. Thus, when the electrically insulating element is not mounted on the connection block, it is possible to remove or to position the connection elements in the connection block, with no further unlocking operations.

Advantageously, said electrical connection device is configured so that the electrical connection elements are held in position between the connection block and the electrically insulating element by translation end stops.

According to one aspect of the invention, said connection block comprises an opening configured to allow the passage of a connection cable electrically connecting the electrical connection elements to the motor, the electrically insulating element comprising a rear partition designed to at least partially close the opening of the connection block. Said electrical connection elements are also configured to be introduced into the connection block via said opening of the connection block. By virtue of the invention, the connection block has just one single opening allowing electrical connection elements and connection cables to be mounted and removed. By limiting the number of openings in the connection block the invention thus makes it possible to reduce the risk of electric arcing between the wall and the electrical elements situated inside the connection block.

According to one embodiment of the invention, the rear partition of the electrically insulating element has a shape that complements the opening of the connection block.

Advantageously, said rear partition of the electrically insulating element forms end stops keeping said electrical connection elements in position. It is notably the holding end stops which act as end stops for said electrical connection elements when said connection block is being introduced into said electrically insulating element. Advantageously, the rear partition of the electrically insulating element forms an end stop holding all said electrical connection elements in position.

According to one aspect of the invention, the rear partition comprises at least one channel section forming one of said end stops keeping one of said electrical connection elements in position, said channel section guiding the corresponding connection cable.

According to one exemplary embodiment of the invention, said channel section or sections are configured to extend parallel to the corresponding connection cable. Advantageously, the channel sections are mutually parallel.

According to one aspect of the invention, the rear partition comprises a guide sleeve for the mounting of said or each of said connection cables. Advantageously, the channel section or sections are in the continuation of the corresponding guide sleeve.

According to one exemplary embodiment of the invention, the electrically insulating element is made of plastic and, preferably, in one piece. Such an electrically insulating element has a low cost of manufacture and can be assembled in very few steps given that it is of one piece.

According to one aspect of the invention, the electrically insulating element comprises locking means configured to allow the electrically insulating element to be immobilized on the connection block. The locking means advantageously make the manual mounting of the electrically insulating element easier.

Advantageously, the locking means comprise a deformable locking bolt taking the form of a clip-fastening tooth. Such a tooth is simple to manufacture and allows the electrically insulating element to fasten effectively to the connection block.

According to one aspect of the invention, the electrically insulating element is flexible so as to allow it to be mounted and locked on said connection block.

The connection block for example comprises at least one recess, said recesses forming a keeper of said locking means.

According to one exemplary embodiment of the invention, said electrical connection elements are between a distal end of one or several of said channel sections and a front wall of the connection block and between a rear partition of the electrically insulating element and a rear wall of the recess or one of the recesses of the connection block. In this way, the electrical connection elements are perfectly held in position and are so in a given zone of said connection device, particularly facing openings able to accept said connection terminal.

The invention also relates to a compressor comprising an electrical connection device as described hereinabove.

Figure 2:
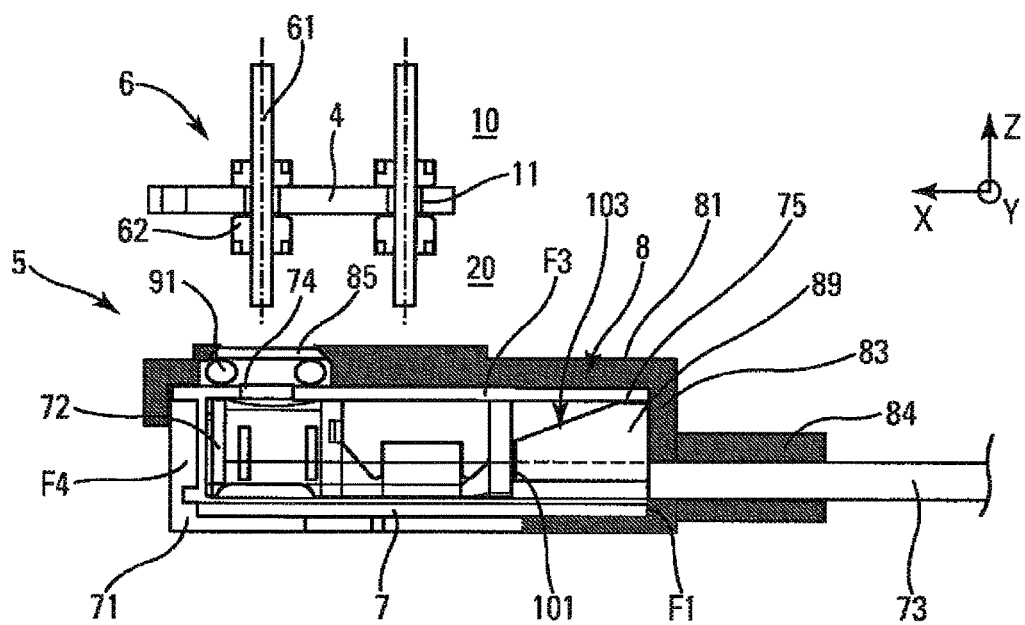
Figure 3A:
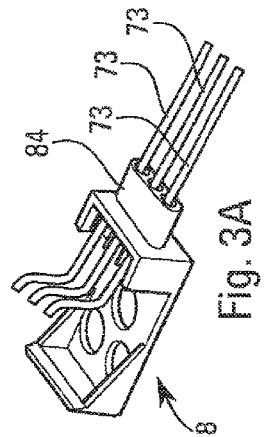
Figure 3B:
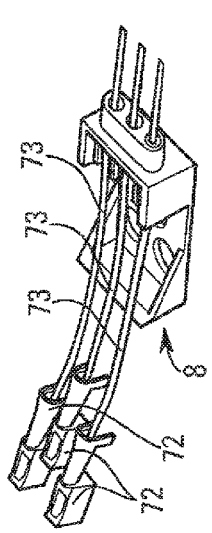
Figure 3C:
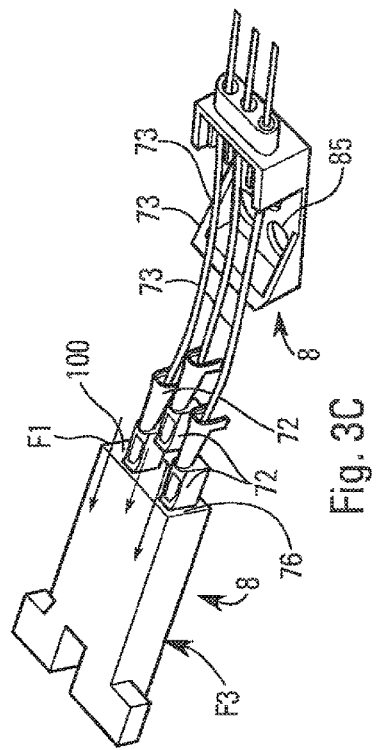
Figure 3D:
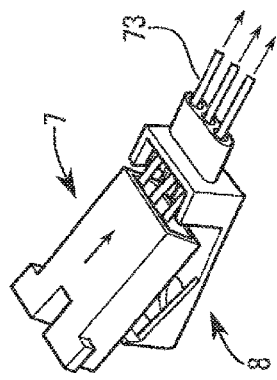
Figure 3E:
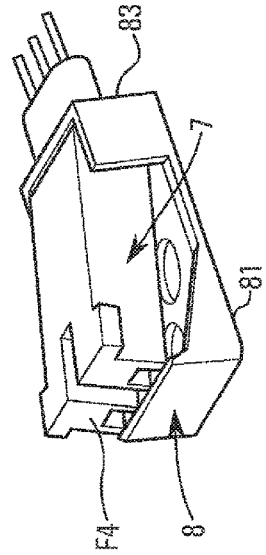
Figure 3F:
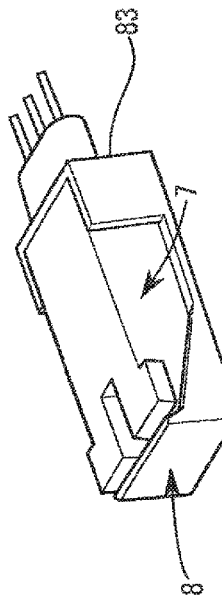
Figure 4:
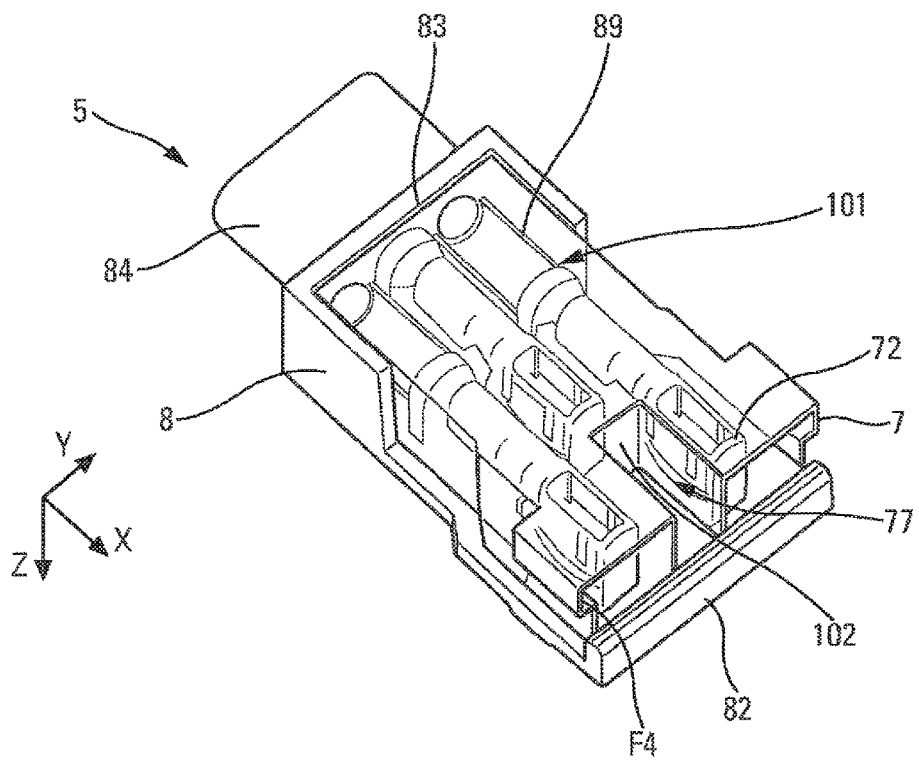
Figure 5:
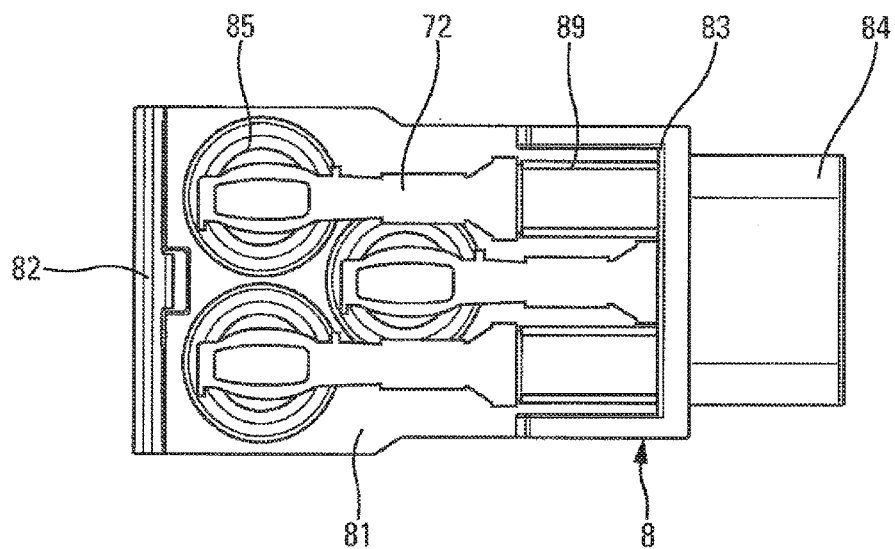
Figure 6:
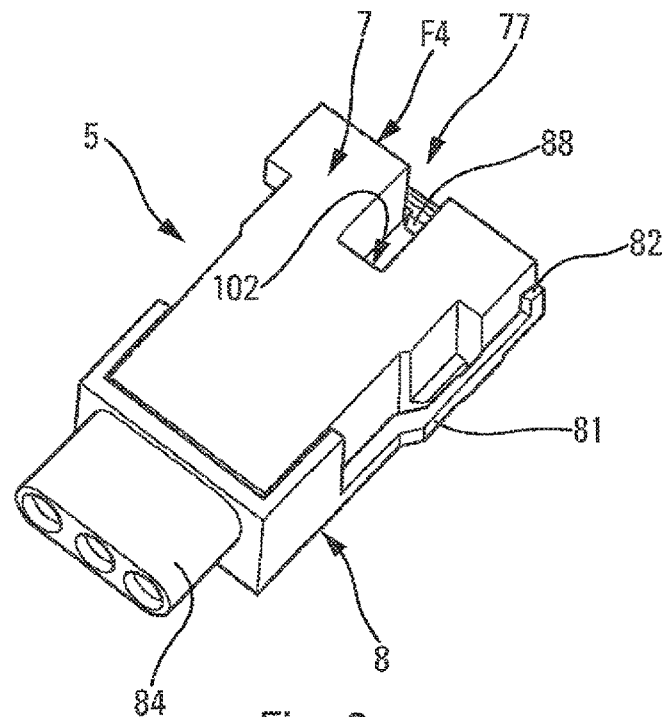
Figure 7:
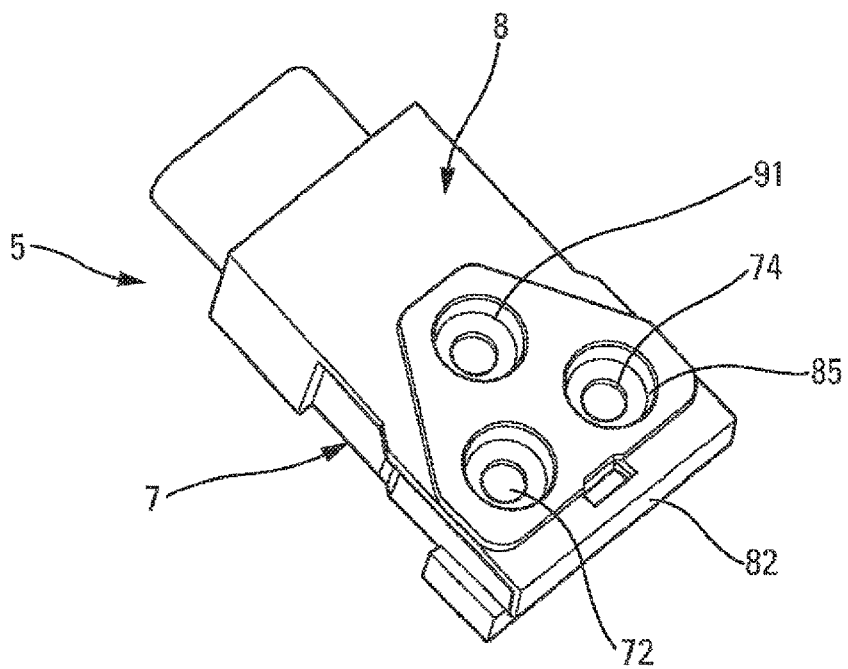

The invention will be better understood from reading the description which will follow, given solely by way of example, and with reference to the attached drawings in which:

FIG. 1 is a schematic view in cross section of an electric compressor according to the invention, FIG. 2 is a schematic view depicting, in a longitudinal plane of section, an electrical connection device according to the invention with a connection terminal of the compressor, FIGS. 3A-3F depict steps in the assembly of the electrical connection device of the invention, illustrated in perspective, FIG. 4 is a schematic perspective view showing hidden detail depicting the electrical connection device of the invention, FIG. 5 is a view from beneath of an electrically insulating element and of electrical connection elements of an electrical connection device according to the invention, and FIGS. 6 and 7 are perspective views of the electrical connection device of the invention, from different view points.

It should be noted that the figures explain the invention in detail so that the invention can be carried out, it of course being possible for said figures to be used if appropriate to better define the invention.

FIG. 1 schematically illustrates an electric compressor 9 comprising an electrical connection device 5 according to the invention. The compressor 9 is an electric compressor insofar as it incorporates an electric motor 2 which drives a compression mechanism 3. The electric motor 2 comprises a stator and a rotor secured to a motor shaft which extends longitudinally along an axis H as depicted in FIG. 1. The compression mechanism 3 comprises fixed parts and moving parts, the latter being set in rotation by the shaft of the electric motor 2. The compression mechanism 3 is of the scroll type or of the sliding vane type or even of the piston type, these examples being given by way of illustration without thereby limiting the scope of the invention.

The compressor 9 further comprises a control device 1 for controlling the electric motor 2. This control device 1 is notably an inverter that converts continuous current from the vehicle on-board network into a sinusoidal current powering the electric motor 2.

The compressor 9 is delineated from its external environment by a housing. The housing here is a part made of aluminum or aluminum alloy, of hollow circular shape comprising a peripheral wall delimiting an internal volume. This housing, in this example, comprises at least three compartments which take the form of cavities or spaces made inside the housing, in which the control device 1, the electric motor 2 and the compression mechanism 3 are respectively mounted as indicated in FIG. 1. These compartments are distinct volumes separated from one another by at least one wall. It will therefore be appreciated that these compartments may be delineated by a single peripheral part that forms the housing or, for example, distinct sub-housings each one dedicated to a compartment and which are assembled with one another to form the compressor 9.

In this example, the compressor 9 comprises a main housing, forming a motor compartment 20 which houses the electric motor 2 and to which is attached, at a first end, a housing forming a control compartment 10 in which the control device 1 is housed and, at a second end, on the opposite side of the electric motor 2 to the first end, a housing forming a compression compartment 30 in which the compression mechanism 3 is housed. In other words, the motor compartment 20 is sandwiched between the control compartment 10 and the compression compartment 30.

In operation, a fluid or a mixture consisting of a refrigerant mixed with a lubricant enters the motor compartment 20 and flows around and through the electric motor 2. The refrigerant is a subcritical fluid such as R134a for example, but could also be a supercritical refrigerant such as carbon dioxide for example, known by the name R744. The lubricant is, for example, a compound of the polyalkylene glycol type.

The fluid flows through the motor compartment 20 then into the compression compartment 30 in which. the compression mechanism 3 is housed. The latter effects the desired increase in pressure and temperature on the refrigerant. The circulation of the refrigerant in contact with the motor provides the cooling of the latter.

The motor compartment 20 is separated from the control compartment 10 by a wall 4 which prevents fluid from entering the control compartment 10. It will therefore be appreciated that, in order to protect the control device 1 which comprises elements at high electrical potential, the fluid present in the motor compartment 20 does not flow into the control compartment 10.

Remember, the control device 1 supplies the electrical energy to the electric motor 2. Because these components are in two distinct compartments it is necessary for the control device 1 to be electrically connected in a fluid tight manner to the electric motor 2. To do this, the electrical connection device 5 according to the invention is mounted at the interface between the motor compartment 20 and the control compartment 10, in this instance on the side of the motor compartment 20. A connection terminal 6 of the control device 1 is connected to the electric motor 2 by a connection block 7 of said connection device.

With reference to FIG. 2, the connection terminal 6 here comprises three conducting rods 61 (one of which cannot be seen) each one mounted in an orifice in the wall 4. In this example, the conducting rods 61 pass in a sealed manner through the wall 4 at a ring 11, preferably made of glass, so as to insulate them electrically from the wall 4. The conducting rods 61 are respectively housed in three connection openings 74 of the connection block 7. The ends of the conducting rods 61 respectively project into the control compartment 10 and motor compartment 20. In this example, the connection terminal 6 extends substantially parallel to the axis of the motor 2. To prevent electric arcing between the conducting rods 61 and the material of the wall 4, each conducting rod 61 is mounted with an insulating sleeve 62, preferably made of ceramic, which is secured to the wall 4 by bonding to the insulating penetrating glass part 11.

The connection block 7 here comprises a body made of plastic 71 of parallelepipedal overall shape, the length extending in the direction X, the width in the direction Y and the height in the direction Z. The connection block 7 accommodates a plurality of connection elements 72, in this instance three elements mounted removably in the internal volumes of the body 71. Said connection elements 72 allow the connection terminal 6 to be electrically connected to the motor 2 by electric cables 73. They are arranged in a triangle. In other words, they are not aligned. In this instance, two of them are lateral and the third is central.

Each of the connection elements 72 is designed to collaborate with one of the conducting rods 61. These connection elements 72 are known to those skilled in the art and will not be detailed further. The connection block 7 is removable from the conducting rods 61 mounted in the wall 4 so as to allow the compressor 9 to be mounted in modular manner.

Hereinafter, the terms "rear" and "front" are defined with respect to the axis X which is oriented from the rear toward the front in FIG. 2. Likewise, the axis Z is used to provide an orientation, in this instance being oriented from the bottom upward in FIG. 2.

A rear face F1 of the body 71 of the connection block 7 comprises an opening (referenced 100 in FIG. 3C) to allow the three connection elements 72 to be introduced and to allow the passage of the electric cables 73.

In order to allow the connection terminal 6 to be connected to a connection element 72, an upper face F3 of the body 71 comprises connection openings 74 (best visible in FIG. 8) of a diameter greater than 3.2 mm, preferably 3.7 mm.

Given these openings formed in the body 71 of the connection block 7 there are paths along which an electric arc can form between the wall 4 which is at zero electrical potential and between an electrical element at high potential belonging to the connection device 5.

In order to increase the electrical insulation of the connection device 5 and as illustrated in FIG. 2, an electrically insulating element 8 is mounted removably on the connection block 7 so as to insulate the electrical connection element 72 from the wall separating the electric motor 2 from the control device 1. The electrically insulating element 8 is positioned between the wall 4 and the connection block 7. The connection block 7 is used here to hold a seal 91. Such a seal 91 is intended to surround the insulating sleeve. 62 to enhance the abovementioned effect.

According to the invention, the electrically insulating element 8 is configured to provide an end stop for said electrical connection elements 72 as said connection block 7 is introduced into said electrically insulating element 8.

Said lateral electrical connection elements 72 are immobilized here by the wall F4 of the connection block 7 on the one side and by the distal ends of two channel sections 89 of the electrically insulating element 8, whereas said central electrical connection element is positioned between a wall 74 of the connection block and the wall 83 of the insulating element 8, as will be detailed later on.

In this example, the electrically insulating element 8 takes the form of a cap 8 of said connection block 7. It goes without saying that the electrically insulating element 8 may take various forms, for example the form of an insulating block, etc.

The electrically insulating element 8 may comprise an interface partition 81 positioned between the wall 4 and the connection block 7 and covering the upper face F3 of the body 71 and a rear partition 83 designed to close the rear face F1 of the body 71. In this example, the electrically insulating element 8 is of one piece and is designed to deform elastically upon mounting, the electrically insulating element 8 then being held on the connection block 7 by clip fastening. In particular, the material of the electrically insulating element is advantageously chosen to allow the interface partition 81 to be elastic so that it can deform as it is mounted on the body of the connection block 7. Such an electrically insulating element 8 is made from a polyester-based material such as a polybutylene terephthalate commonly known as PBT, which allows it to achieve suitable deformation properties.

The interface partition 81 is planar and extends in the plane (X, Y). Only through-openings 85 are formed in the partition 81 to come into register with the connection openings 74 of the body 71. The diameter of the through-openings 85 is substantially equal to that of the insulating sleeves 62 of the connection terminal 6 so as to allow a mounting through mating of shapes that makes it possible to improve the electrical insulation upon connection 5 and limit the ingress of liquid into the body 71 of the connection block 7 via the connection openings 74.

Such an electrically insulating element 8 makes it possible to avoid electric arcing between the conducting rods 61 given that the electrically insulating element 8 is able to surround the insulating sleeves made of ceramic 62.

As already mentioned, in order to improve this insulation, a sealing means 91 is advantageously positioned between the housing 7 and the electrically insulating element 8 so as to surround the insulating sleeves made of ceramic 62 of said connection terminal 6. This may be the seal already mentioned. As an alternative, by way of example, said sealing means 91 is a molded component positioned between the connection block 7 and the electrically insulating element 8. It may also be of the type of an overmolding of rubber directly onto the electrically insulating element 8.

In a use position, the sealing means 91 extends in a plane transverse to the axis in which the connection terminal 6 extends. In this instance it is situated between the connection block 7 and the electrically insulating element 8 and, in particular, between the connection openings 74 and the through-openings 85. Such a sealing means 91, particularly such a seal, preferably an annular one, allows an improvement in the sealing of the connection between the connection rods 61 and the connection block 7.

Furthermore, on account of its thickness, the seal 91 makes it possible to increase the insulation distance on the one hand between the wall 4 and the connection block 7 and, on the other hand, between two connection rods 61. In this example, each seal 91 is preferably made of a copolymer, for example of the hydrogenated nitrile rubber type commonly referred to as HNBR.

FIGS. 3A to 3F illustrate how the electrical connection block 7 is inserted into the electrically insulating element 8 and the end stop role for the electrical connection elements 72 of the electrically insulating element 8 during this insertion. Thus, in FIG. 3A, the connection cables 73 are first of all introduced into the canals of a guide sleeve 84 of the electrically insulating element 8 from the rear. Next, the free ends of the connection cables 73 are electrically connected to the connection elements 72 as depicted in FIG. 3B. The connection elements 72 are then introduced into the body 71 from the rear face F1 and positioned more or less accurately facing the connection openings of the upper face F3 of the body 71 (FIG. 3C). The connection block 7 is thus configured to allow the electrical connection elements 72 to be introduced into the connection block 7 in a direction, referred to as the direction of mounting, parallel to the direction X. It will further be understood that the electrical connection elements 72 are capable of translational movement in the electrically insulating element 8 when said connection block 7 is not present.

Once the connection elements 72 have been mounted in the body 71, the connection block 7 is introduced into the electrically insulating element, accompanying the connection cables 73 in a movement toward the rear so as to cause the rear part of the body 71 to collaborate with the rear partition 83 of the electrically insulating element 8 as depicted in FIGS. 3D and 3E. In the position illustrated in FIG. 3E, the electrically insulating element 8 begins to act as an end stop for said electrical connection elements so as therefore to ensure that they are correctly positioned, namely positioned in a way that allows the electrical connection elements 72 to electrically connect the connection terminal with the electric cables 73 being situated facing the connection openings and through-openings. The electrically insulating element 8 performs this function notably by virtue of said retaining end stops. To finalize mounting, with reference to FIG. 3F, the connection block can be twisted inside the electrically insulated element 8 and is locked, notably by clip fastening as explained hereinafter. During this last operation, the electrical connection elements are already in a correct position allowing them to accept said electrical terminal.

By virtue of the invention, the opening in the rear face F1 is the only opening of the electrical connection device needed for mounting and removing the electrical cables 73 and the electrical connection elements 72. This then avoids the need to position other openings on the connection block 7 than those devoted to the connecting of the connection terminal and the one devoted to the passage of the electric cables for mounting, dismantling and also holding the electrical connection elements 73 in the connection device 5.

With reference now to FIG. 4, it may be seen that a front partition 82 of the electrically insulating element 8 is planar and extends in the plane (Y, Z), namely at right angles to the interface partition 81.

The rear partition 83 of the electrically insulating element 8 has, itself, a shape that complements the rear part of the body 71 so as to allow optimal collaboration between the connection block 7 and the electrically insulating element 8. Because of the complementing shapes of the connection block 7 and the electrically insulating element 8, the connection block 7 is pressed firmly against the electrically insulating element 8, guaranteeing optimized retention and reduction in vibrations between these components.

The rear partition 83 of the electrically insulating element makes it possible on the one hand to close the rear face F1 of the connection block and, on the other hand, to allow the passage of the connection cables 73 connected to the connection elements 72 mounted in the body 71. For this, the rear partition 83 comprises the guide sleeve 84 extending along the axis X and which comprises three canals for respectively guiding the three connection cables 73 connecting the three connection elements 72. It thus allows said connection cable 73 to be mounted in the electrically insulating element 8.

In other words, the electrically insulating element takes the overall shape of a U in which the base of the U corresponds to the interface partition 81 while the branches of the U correspond to the front 82 and rear 83 partitions.

According to the invention, the electrical connection device 5 is thus advantageously configured so that the electrical connection elements 72 are held in position between the connection block 7 and the electrically insulating element 8 by translation end stops. The electrical connection elements thus find themselves immobilized in the electrical connection device in the exact position that allows them to accept the electrical terminal. The electrical connection elements 72 are between a distal end 101 of said channel sections 89 and the front wall F4 of the connection block 7 as far as the lateral electrical connection elements 72 are concerned, and between the rear partition 83 of the electrically insulating element 8 and a rear wall 102 of a recess 77 made at the front wall F4 of the connection block 7.

It is therefore advantageously the rear partition 83 of the electrically insulating element 8 that forms the end stops that keep said electrical connection elements 72 in position either directly or via said channel sections. The electrically insulating element 8 makes it possible both to provide an end stop for said electrical connection elements 72 as said connection block 7 is being introduced into said electrically insulating element 8 and to keep the electrical connection elements 72 in position in the connection block 7 when the connection device is mounted, as seen earlier.

In the example illustrated, the electrically insulating element 8 comprises two channel sections 89 which keep the lateral electrical connection elements 72 in position in the connection block 7. These channel sections 89 project with respect to the rear partition 83 toward the inside of the electrical connection device 5. When the connection block 7 is mounted on the electrically insulating element 8, the channel sections 89 become inserted inside the connection block 7 through the opening in the rear face F1 of the connection block 7 so that they immobilize the lateral connection elements 72 inside the connection block 7 as seen earlier.

The channel sections 89 are in the continuation of the guide sleeve 84. They guide each corresponding connection cable 73. The channel sections are configured to extend parallel to the connection cable 73 that they guide. In this instance they are mutually parallel.

In this embodiment, the rear partition 83 of the electrically insulating element 8 also forms an end stop for keeping the central connection element 72 in position. The partition 83 comes to press directly against the end of the connection element so as to hold it in position, notably in terms of translational movement along the axis X, as illustrated in FIGS. 4 and 5. Thus, the rear partition 83 of the electrically insulating element 8 here forms an end stop keeping all the electrical connection elements 72 in position. The central connection element 72 is offset along the axis X with respect to the other two connection elements 72, which in this instance means to say backward with respect to the other two connection elements 72 so as to be able to connect to the three conducting rods of the connection terminal which, as has already been stated, are positioned at the vertices of a triangle.

The channel sections 89 here define inclined walls 103 which offer an effect of guidance to lateral walls 75 of the connection block 7, during mounting and, after mounting, offer an effect of sandwiching said lateral walls 75 of the connection block 7 between said channel sections 89 and the interface partition 81 of the electrically insulating element 8.

The inclined walls thus define means which encourage the introduction of the electrical connection block 7 into the electrically insulating element 8. Furthermore, the top part of each channel section 89 is spaced away from the interface partition 81, thus forming a recess. Such a recess is of a dimension substantially equal to the thickness of the lateral wall 75 of the connection block, thus allowing the connection block 7 to be retained by the electrically insulating element 8, along the axis Z, in the region of the rear part thereof.

As illustrated in FIG. 6, the electrically insulating element 8 here comprises locking means, preferably elastic ones, configured to allow the electrically insulating element 8 to be mounted and removed in relation to the connection block 7. The locking means thus allow the electrically insulating element 8 to be immobilized on the connection block. They comprise a deformable locking bolt taking the form of a clip-fastening tooth 88 formed from the front partition 82 and preferably intended to be flexible. The clip-fastening tooth 88 is, for example, produced as a projection toward the inside of the electrically insulating element 8, out of the front partition 82. The locking means are situated in the region of a central part of the front partition 82, the two ends of the front partition being pressed firmly against a front face F4 of the connection block 7.

The clip-fastening tooth is able to catch on the connection block 7, at a central part of the connection block 7, particularly in the region of a recess 77 delimited in part by a plate running perpendicular to the front face, namely according to the plane (X, Y), using the flexibility of the interface partition 81 and/or the flexibility of the front partition 82. The recess thus forms a keeper for the locking bolt of said locking means.

FIG. 7 illustrates the interface partition 81 in a view from above. It will be better understood here that the through-openings 85 are situated facing the connection openings 74 so as to allow the conducting rods to be introduced into the electrical connection device so that they can come into contact with the connection elements 72.

The invention claimed is:

1. An electrical connection device for a compressor, the electrical connection device comprising:
 a connection block for connection to an electric motor of the compressor,
 said connection block comprising a single opening for receiving a plurality of electrical connection elements;
 the plurality of removable electrical connection elements, fitted in a triangle into said connection block to collaborate with a connection terminal of a control device for controlling said electric motor; and
 at least one electrically insulating element mounted removably on the connection block so as to insulate the electrical connection elements from a wall separating the control device from the electric motor,
 said electrically insulating element being configured to provide an end stop for said electrical connection elements as said connection block is inserted into said electrically insulating element.

2. The electrical connection device as claimed in claim 1, in which said connection block is configured to allow said electrical connection elements to be introduced into said connection block in a direction referred to as a direction of mounting.

3. The electrical connection device as claimed in claim 1, in which the electrical connection elements are capable of translational movement in the connection block when said electrically insulating element is not present.

4. The electrical connection device as claimed in claim 1, wherein the device is configured so that the electrical connection elements are held in position between the connection block and the electrically insulating element by translation end stops.

5. The electrical connection device as claimed in claim 1, in which said connection block comprises the single opening configured to allow the passage of a connection cable electrically connecting the electrical connection elements to the motor, the electrically insulating element comprising a rear partition designed to at least partially close the single opening of the connection block.

6. The electrical connection device as claimed in claim 5, in which the rear partition of the electrically insulating element has a shape that complements the single opening of the connection block.

7. The electrical connection device as claimed in claim 5, in which said rear partition of the electrically insulating element forms end stops keeping said electrical connection elements in position.

8. The electrical connection device as claimed in claim 7, in which the rear partition comprises at least one channel section forming one of said end stops keeping one of said electrical connection elements in position, said channel section guiding the corresponding connection cable.

9. The electrical connection device as claimed in claim 8, in which said channel section or sections are configured to extend parallel to the corresponding connection cable.

10. The electrical connection device as claimed in claim 8, in which the rear partition comprises a guide sleeve for the mounting of said or each of said connection cables.

11. The electrical connection device as claimed in claim 10, in which the channel section or sections are in the continuation of the corresponding guide sleeve.

12. The electrical connection device as claimed in claim 8, in which said electrical connection elements are between a distal end of one or several of said channel sections and a front wall of the connection block and between the rear partition of the electrically insulating element and a rear wall of a recess of the connection block.

13. A compressor comprising an electrical connection device as claimed in claim 1.

14. An electrical connection device for a compressor, the electrical connection device comprising:
- a connection block for connection to an electric motor of the compressor;
- a plurality of removable electrical connection elements, fitted in a triangle into said connection block to collaborate with a connection terminal of a control device for controlling said electric motor; and
- at least one electrically insulating element mounted removably on the connection block so as to insulate the electrical connection elements from a wall separating the control device from the electric motor,
- said connection block configured to hold at least one seal which surrounds a sleeve to increase the electrical insulation of the connection device, and
- said electrically insulating element being configured to provide an end stop for said electrical connection elements as said connection block is inserted into said electrically insulating element.

15. An electrical connection device for a compressor, the electrical connection device comprising:
- a connection block for connection to an electric motor of the compressor;
- a plurality of removable electrical connection elements, fitted in a triangle into said connection block to collaborate with a connection terminal of a control device for controlling said electric motor; and
- at least one electrically insulating element mounted removably on the connection block so as to insulate the electrical connection elements from a wall separating the control device from the electric motor,
- said electrically insulating element comprising a rear partition with at least one channel section defined by inclined walls, and
- said electrically insulating element being configured to provide an end stop for said electrical connection elements as said connection block is inserted into said electrically insulating element.

* * * * *